R. N. Bennett,
Harrow.
No. 96,191. Patented Oct. 26, 1869.

Witnesses
G. A. Smith
E. R. Brown

Inventor
R. N. Bennett
By T. C. Theaker
his attorney.

United States Patent Office.

R. N. BENNETT, OF UNION MILLS, INDIANA.

Letters Patent No. 96,191, dated October 26, 1869.

IMPROVEMENT IN HARROWS.

The Schedule referred to in these Letters Patent and making part of the same.

*To all whom it may concern:*

Be it known that I, R. N. BENNETT, of Union Mills, in the county of La Porte, and State of Indiana, have invented a new and useful Improvement in Harrows; and I do hereby declare that the following is a full, clear, and exact description thereof, reference being had to the accompanying drawings, in which—

Figure 1:
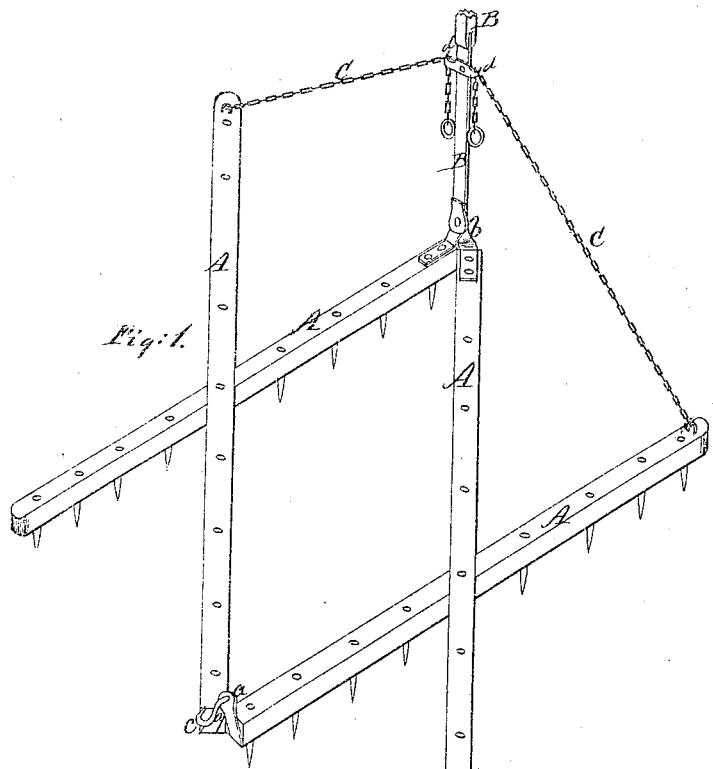
Figure 2:
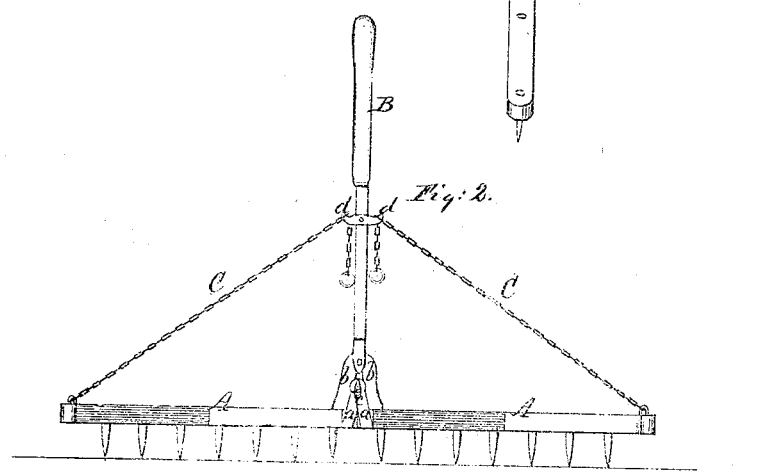

Figure 1 is a perspective view, and
Figure 2, a front elevation.

Like letters designate like parts in all the figures.

The nature of my invention consists in attaching a hand-lever to the rear hinge of a double harrow, and in attaching to the rear outer ends of the harrow two chains, which extend to the hand-lever, and are hooked thereto.

To enable those skilled in the art to make and use my invention, I will proceed to describe its construction and operation.

In the drawing—

A A represent the two parts of the harrow, each part being formed by two pieces, crossing each other, as in the common harrow, or, if desired, they may be square.

These parts are held together by hinges *a b*.

The hinge *a* is formed of two pieces, secured to the front inside ends of the parts A A, and extend up above the top of the harrow, and their upper ends are pivoted by means of the hook *c*, to which a whiffletree or chain may be attached.

The hinge *b* is attached to the rear inside ends of the harrow, and is also formed of two pieces, which extend above the cross-pieces of the harrow.

Pivoted to this hinge, is a hand-lever, B, on each side of which are two hooks. *d d*.

To the rear outer ends of the harrow are secured two chains, C C, which extend up, and are hooked into the hooks *d d* on the hand-lever B.

In the frame of the harrow are teeth of the ordinary construction.

When the harrow is in motion, should one side of it become clogged up, by throwing the lever B to the right, the left-hand side of the harrow will be raised up, and freed from anything that may have accumulated in the teeth; and by throwing the lever B in the opposite direction, the other side will be raised, &c.

Having thus fully described my invention,

What I claim, and desire to secure by Letters Patent, is—

The combination of the hand-lever B, chains C C, or their equivalents, with a double-harrow, substantially as shown and described.

R. N. BENNETT.

Witnesses:
D. L. BENNETT,
JONATHAN SNOOK.